(12) United States Patent
Lin et al.

US009066239B2

(10) Patent No.: US 9,066,239 B2
(45) Date of Patent: *Jun. 23, 2015

(54) REDUCING SPECTRUM INTERFERENCE BETWEEN WIRELESS NETWORKS

(75) Inventors: Yonghua Lin, Haidian (CN); Jianbin Tang, Melbourne Vic (AU); Jun Song Wang, Beijing (CN); Qing Wang, Beijing (CN); Rong Yan, Beijing (CN); Hai Zhan, Beijing (CN); Chao Zhu, Beijing (CN); Zhen Bo Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,269

(22) Filed: Aug. 22, 2012

(65) Prior Publication Data
US 2012/0315942 A1 Dec. 13, 2012

Related U.S. Application Data

(63) Continuation of application No. 13/479,313, filed on May 24, 2012.

(51) Int. Cl.
*H04W 72/00* (2009.01)
*H04W 16/14* (2009.01)
(Continued)

(52) U.S. Cl.
CPC .......... *H04W 16/14* (2013.01); *H04W 72/0486* (2013.01); *H04W 72/085* (2013.01); *H04W 72/087* (2013.01); *H04W 72/10* (2013.01)

(58) Field of Classification Search
USPC .................................. 455/450, 454
See application file for complete search history.

(56) References Cited

U.S. PATENT DOCUMENTS 6,487,183 B1    11/2002 Lo et al.
6,871,071 B2 *  3/2005 Takao et al. .................. 455/436
(Continued)

FOREIGN PATENT DOCUMENTS

CN    101584233 A    11/2009
CN    101765120 A    6/2010
(Continued)

OTHER PUBLICATIONS

Search Report dated Aug. 29, 2012 received from the European Patent Office.
(Continued)

*Primary Examiner* — Ayodeji Ayotunde
(74) *Attorney, Agent, or Firm* — Scully, Scott, Murphy & Presser, P.C.; Jennifer Davis, Esq.

(57) ABSTRACT

A method and apparatus for reducing spectrum interference between wireless networks. This is realized by arranging at least one sub-coordinating apparatus, namely, a monitoring apparatus, in respective wireless network, and by arranging a coordinating apparatus, namely, an allocation apparatus in the whole network. Wherein, the sub-coordinating apparatus monitors the spectrum utilization situation of the wireless network where it is located, reports it to the coordinating apparatus, and requests the coordinating apparatus for spectrum resource when new spectrum resource is needed. The coordinating apparatus maintains the spectrum utilization information of each wireless network, and allocates appropriate spectrum resource to the sub-coordinating apparatus which requests spectrum resource based on the maintained information. Therefore, the interference of inter-wireless networks is reduced or even avoided through such overall management that the coordinating apparatus allocates corresponding spectrum resources to a plurality of wireless networks capable of sharing spectrum resources.

11 Claims, 6 Drawing Sheets

(51) Int. Cl.
*H04W 72/04* (2009.01)
*H04W 72/08* (2009.01)
*H04W 72/10* (2009.01)

(56) References Cited

U.S. PATENT DOCUMENTS

| | | | |
|---|---|---|---|
| 7,773,513 B2 | 8/2010 | Beaujean et al. | |
| 8,706,130 B2 | 4/2014 | Westerberg et al. | |
| 2002/0160777 A1* | 10/2002 | Takao et al. | 455/436 |
| 2004/0170156 A1* | 9/2004 | O'Neill | 370/349 |
| 2007/0116010 A1 | 5/2007 | Cho | |
| 2007/0213069 A1* | 9/2007 | Ji et al. | 455/450 |
| 2007/0249361 A1 | 10/2007 | Klang et al. | |
| 2007/0281710 A1 | 12/2007 | Bai et al. | |
| 2008/0108365 A1 | 5/2008 | Buddhikot et al. | |
| 2008/0214200 A1 | 9/2008 | Grandblaise et al. | |
| 2009/0157826 A1* | 6/2009 | Stettner | 709/206 |
| 2010/0110887 A1* | 5/2010 | Beaujean et al. | 370/230 |
| 2010/0248739 A1 | 9/2010 | Westerberg et al. | |
| 2010/0273468 A1* | 10/2010 | Bienas et al. | 455/418 |
| 2011/0029347 A1 | 2/2011 | Kozat et al. | |
| 2011/0263250 A1* | 10/2011 | Mueck et al. | 455/434 |
| 2011/0282989 A1* | 11/2011 | Geirhofer et al. | 709/224 |
| 2011/0286408 A1* | 11/2011 | Flore et al. | 370/329 |
| 2013/0273928 A1 | 10/2013 | Westerberg et al. | |

FOREIGN PATENT DOCUMENTS

| | | |
|---|---|---|
| WO | WO 2008/088254 A1 | 7/2008 |
| WO | WO-2010049930 A1 | 5/2010 |
| WO | WO 2011/103122 | 8/2011 |
| WO | WO 2011/121443 A2 | 10/2011 |
| WO | WO 2011/148035 A1 | 12/2011 |

OTHER PUBLICATIONS

Office Action dated Dec. 4, 2013 received in a related U.S. Appl. No. 13/479,313.

* cited by examiner ered the invention for assisting in a better understanding of the invention. However, it should be noted that it is not a confirmation that all contents presented in this part belong to the prior art. The content mentioned in this part may be prior art, but may also be technical content that is merely known to the inventor of the present patent application but does not constitute the prior art.

REDUCING SPECTRUM INTERFERENCE BETWEEN WIRELESS NETWORKS

CROSS REFERENCE TO RELATED APPLICATION

This application is a continuation of and claims priority from U.S. application Ser. No. 13/479,313 filed on May 24, 2012, which in turn claims priority under 35 U.S.C. 119 from Chinese Application 201110140954.9, filed May 27, 2011, the entire contents of both applications are incorporated herein by reference.

BACKGROUND OF THE INVENTION

1. Field of the Invention

This invention relates to network communication, and in particular, relates to a method and apparatus for reducing inter-wireless networks spectrum interference.

2. Description of the Related Art

The following description is a background introduction of the invention for assisting in a better understanding of the invention. However, it should be noted that it is not a confirmation that all contents presented in this part belong to the prior art. The content mentioned in this part may be prior art, but may also be technical content that is merely known to the inventor of the present patent application but does not constitute the prior art.

At present, network applications have already been popularized, and such widespread application is followed by network interference. In fact, the interference problem is almost everywhere, for example, inter-cell interference in cellular networks, interference from simultaneous transmission in ad-hoc networks, interference between adjacent networks in a wireless local area network, etc. As a rapid development of wireless network technologies and network applications, more and more network types and network applications are available for users to select. The result is that in practical applications, a plurality of heterogeneous wireless networks may co-exist in a specific area. One exemplary environment is, for example, Internet Of Things (IOT) applications. In addition, wireless networks such as WiFi (following the standards like IEEE802.11a/b/g or the like), Bluetooth, Wireless Sensor Networks (WSN) consisting of Zigbee, Wireless HART or the like, can work at the frequency band of 2.4 GHz ISM. Nevertheless, wireless networks of different types are normally different in network frameworks, communication standards followed or protocols, and their working frequencies may be identical, different or overlapping. For instance, channels 1, 6 and 11 in the IEEE802.11b North American channel selection (non-overlapping) standard respectively take 2412 MHz, 2437 MHz, and 2462 MHz as central frequency and occupy a bandwidth of 22 MHz; channels 1, 7 and 13 in the IEEE802.11b European channel selection (non-overlapping) standard respectively take 2412 MHz, 2442 MHz, and 2472 MHz as central frequency and occupy a bandwidth of 22 MHz; while channels 11-26 in the IEEE 802.15.4 channel selection (2400 MHz, physical layer) standard occupy a bandwidth of 2 MHz with a central frequency point every 5 MHz, from 2405 MHz to 2480 MHz. Thus, there may be overlapping among spectrum resources used in wireless networks following different communication protocols or standards, thereby generating an interference which will degrade the performance of the entire network.

However, the existing interference processing schemes are generally unsatisfying in their implementing process and effect. For example, static frequency allocation is widely used in cellular wireless communication systems such as GSM and CDMA, and mainly enables cells at a distance far enough from each other to uses an identical group of channels, which needs a dedicated network to realize the whole planning and lacks a certain degree of flexibility and expansibility. Furthermore, there is a multi-antenna technology in the existing solution, which may suppress interference signals by a proper multi-antenna airspace weighting at the receiving side with the orientation of the antenna when combining desired signals, but such a solution involves complex signal processing. Moreover, although the solution of energy detection which is widely used in networks like WiFi, WSN is relatively easy to implement, it is merely a detection against a fixed detecting point and a specific target point, and if, for example, the user deviates from the detecting point, it will be then unable to discover a potential/hidden interference for the user.

As can be seen from above, how to mitigate or even avoid the interference in wireless networks, especially the interference among heterogeneous wireless networks, is still an existing problem in network applications.

BRIEF SUMMARY OF THE INVENTION

In order to overcome these deficiencies, the present invention provides an allocation apparatus for allocating spectrum resources in wireless networks, including: an allocation apparatus transceiver; spectrum utilization information storage means; and spectrum resource coordination means, wherein: the allocation apparatus transceiver is configured to receive and transmit information; the spectrum utilization information storage means is configured to maintain information associated with a spectrum utilization of at least two wireless networks, wherein the at least two wireless networks share at least part of the spectrum resources; the spectrum resource coordination means is configured to allocate appropriate spectrum resources to the wireless networks monitored by a monitoring apparatus based on the information associated with the spectrum utilization of at least two of the wireless networks maintained by the spectrum utilization information storage means, after receiving information associated with a spectrum requirement from the monitoring apparatus in at least one of the wireless networks via the allocation apparatus transceiver; and the spectrum utilization information storage means updates at least the maintained information associated with the spectrum utilization of the at least two wireless networks monitored by the monitoring apparatus based on the allocation of the spectrum resources by the spectrum resource coordination means.

According to another aspect, the present invention provides a monitoring apparatus for monitoring spectrum utilization in wireless networks, including: a monitoring apparatus transceiver; a spectrum monitor; and a spectrum manager, wherein: the monitoring apparatus transceiver is configured to receive and transmit information; the spectrum monitor is configured to monitor spectrum utilization in the wireless networks and transmit information associated with the spectrum utilization to an allocation apparatus for allocating spectrum resources in one of the wireless networks via the monitoring apparatus transceiver, wherein the wireless network shares at least part of the spectrum resource with at least one other of the wireless network; and the spectrum manager is configured to, based on the spectrum utilization monitored by the spectrum monitor, provided that a new spectrum resource is required, transmit spectrum requirement information to the allocation apparatus via the monitoring apparatus transceiver, and receive an indication from the allocation apparatus that the new spectrum resource has been allocated.

According to yet another aspect, the present invention provides an allocation method for allocating spectrum resources in wireless networks, including: maintaining information associated with spectrum utilization of at least two wireless networks, wherein the at least two wireless networks share at least part of the spectrum resources; receiving information associated with spectrum requirements from a monitoring apparatus in at least one of the wireless networks; allocating appropriate spectrum resources to the wireless network monitored by the monitoring apparatus based on the maintained information associated with the spectrum utilization of at least two of the wireless networks; and updating at least the maintained information associated with the spectrum utilization of the wireless networks monitored by the monitoring apparatus based on the allocation.

According to still yet another aspect, the present invention provides a monitoring method for monitoring spectrum utilization in wireless networks, including: monitoring spectrum utilization in a wireless network and transmitting information associated with the spectrum utilization to an allocation apparatus for allocating spectrum resources in wireless networks, wherein, at least part of the spectrum resources allocated by the allocation apparatus are shared by the wireless network and at least one of the other wireless networks; transmitting spectrum requirement information to the allocation apparatus according to the situation of spectrum utilization of the wireless network, under the circumstance that new spectrum resources are needed; and in response to a receipt of an indication from the allocation apparatus that the new spectrum resources have been allocated, using the allocated new spectrum resources.

BRIEF DESCRIPTION OF SEVERAL VIEWS OF THE DRAWINGS

After reading the following detailed description in combination with figures, other solutions, characteristics and advantages of the invention will be or will become obvious for those skilled in the art. All these other solutions, characteristics and advantages aim to be embraced in this description, covered within the scope of the invention, and protected by the attached claims. However, it should be noted that figures and the following specific explanations both illustrate some exemplary embodiments of the invention for elaborating the concept of the invention, which do not intend to make any concrete limitation to the invention but merely for a purpose of illustrations. Thus, the invention shall not be interpreted or limited to some specific forms in this disclosure. In the figures:

DETAILED DESCRIPTION OF THE PREFERRED EMBODIMENTS

Figure 1:
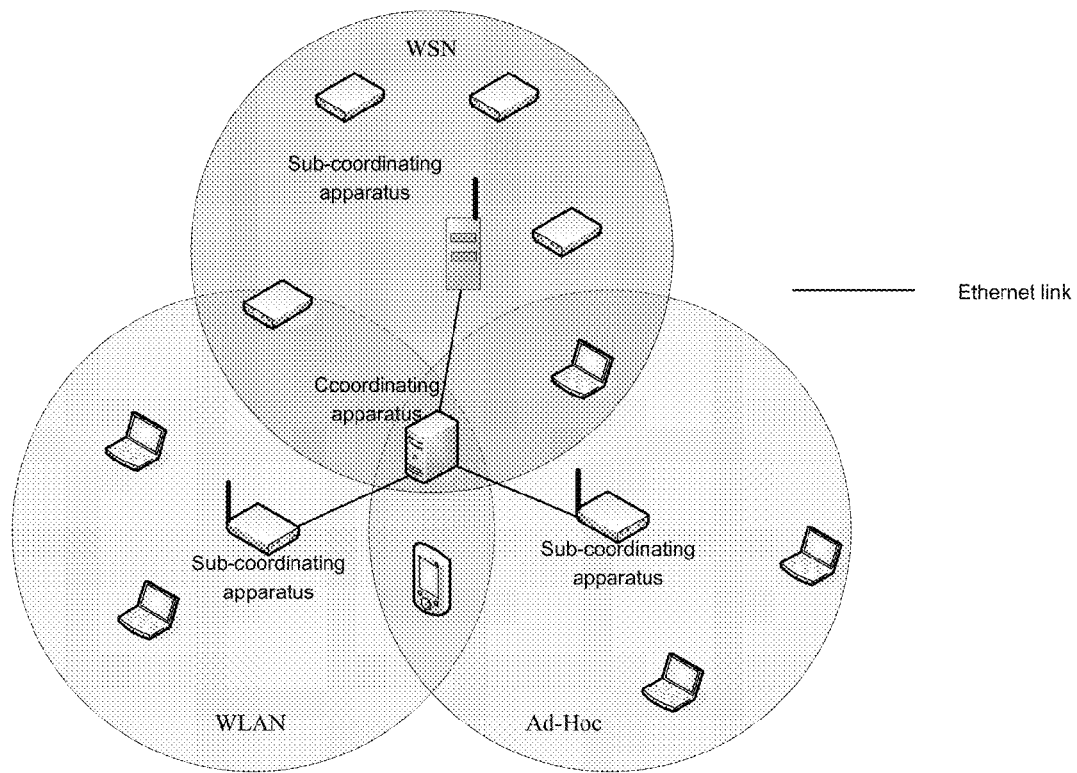
FIG. 1 illustrates a network environment where multiple heterogeneous wireless networks coexist according to an embodiment of the invention.

The present invention realizes a sharing of spectrum resources by several wireless networks through: arranging in each wireless network an apparatus for monitoring spectrum resource utilization in wireless networks, and arranging in networks an apparatus for dynamically allocating spectrum resources shared by wireless networks to wireless networks. In the following, for ease of description, the former is briefly called "sub-coordinating" apparatus (in this description, sometimes it is also called "monitoring apparatus"), while the latter is briefly called "coordinating" apparatus (in this description, sometimes it is also called "allocation apparatus"). According to embodiments of the invention, the sub-coordinating apparatus is responsible for monitoring and notifying the situations of the spectrum utilization of the wireless network where it is located to the coordinating apparatus, while in the whole network, the unique coordinating apparatus is responsible for coordinating or scheduling allocation of shared spectrum resource among wireless networks. One advantage of such a design is that the entire situation of the network can be taken into account for the allocation. FIG. 1 illustrates a network environment where multiple heterogeneous wireless networks coexist according to an embodiment of the invention. Here, heterogeneous networks refer to wireless networks that are different in one, multiple, or all the aspects of the network framework, protocol followed in running, available working spectrum, etc. FIG. 1 exemplarily illustrates three heterogeneous networks: WSN, WLAN and an ad-hoc network. Nevertheless, a person skilled in the art could understand that the application environments of the present invention are not limited to these, but can include any type of wireless networks that are known, under development or in the future, and the invention does not require each wireless network to be a heterogeneous network in the whole network. In other words, the invention is also suitable for the circumstance in which part of the networks in all of the networks are heterogeneous networks. In addition, according to the concrete network environment and application requirement, embodiments of the invention can also be applied to an environment of multiple homogenous wireless networks (in the process of implementation, a person skilled in the art may make an adaptive amendment to the solution of the invention according to the disclosure, if necessary). For example, if the mechanism of processing spectrum interference carried by the homogenous wireless networks fails to produce the expected effect, the solution of the invention may be tried.

Furthermore, FIG. 1 also illustrates a user-side apparatus located in each wireless network, the user-side apparatus being any mobile apparatus capable of performing applications in a specific network, including but not limited to mobile terminal, portable terminal, etc., including mobile phone, station, unit, apparatus, multimedia computer, multimedia board, communicator, laptop, personal digital assistant (PDA) or equivalents or any combination thereof.

As shown in FIG. 1, each wireless network is provided with a sub-coordinating apparatus, and the whole network is provided with a coordinating apparatus (operations about a sub-coordinating apparatus and a coordinating apparatus will be described in details in the following in combination with FIGS. 2 and 3). Wherein, the sub-coordinating apparatus can be a single apparatus, or resident on a proper apparatus in the existing wireless network, like nodes and apparatuses originally used for collecting, processing and managing data, such as access points (AP) in wireless local area networks, anchor (also known as collecting node) in sensor networks, and the like. Another example is, deploying sub-coordinating apparatuses at nodes or apparatuses responsible for managing the overall operation of the network in an ad-hoc network (e.g. on entrance apparatus for data inflow and outflow between this network and other networks). Similarly, the coordinating apparatus can be a single apparatus, or resident on the nodes or apparatuses responsible for jobs like collecting, processing, managing data, etc, and capable of communicating with (through wired or wireless links) the sub-coordinating apparatuses, like the existing server nodes in networks. For instance, in an embodiment, a coordinating apparatus is deployed on a server with wired links (like Ethernet or the like) or wireless links to sub-coordinating apparatuses in each wireless network. According to an embodiment of the invention, if the coordinating apparatus is communicating with the sub-coordinating apparatus through wired links, it can be located at any position in the network. In other embodiments, if the coordinating apparatus is communicating with the sub-coordinating apparatus through wireless links, in an application example, it is arranged in the center of the whole wireless network environment to cover all the existing or potential sub-coordinating apparatuses. However, in another application example, the coordinating apparatus is deployed at an appropriate position in the wireless network environment, so that it can cover part of the existing or potential sub-coordinating apparatuses, and can establish communication connections with the other sub-coordinating apparatuses through other network apparatuses or nodes.

It should be noted that, in the above and latter descriptions, the principle of the present invention is explained by taking an example of deploying one sub-coordinating apparatus in one wireless network. Nevertheless, it is readily understood by a person skilled in the art that deploying more than one sub-coordinating apparatuses in one or more wireless networks is also feasible, and the number of the deployed sub-coordinating apparatuses depends on the concrete network environment and application requirement. For instance, the operation ability of the apparatus performing the operations of the sub-coordinating apparatus is limited, the network covers a large scope, the network applications are complex and various, etc. In this case, one of the multiple sub-coordinating apparatuses in the same wireless network may be chosen as the second level coordinating apparatus of this network, and it is this second level coordinating apparatus that is responsible for interacting with the coordinating apparatus in the entire wireless environment. Alternatively, the plurality of sub-coordinating apparatuses deployed in the same network are peer to peer, so if the coordinating apparatus finds that information received from different sub-coordinating apparatuses in the same network are inconsistent, it may determine the latest information according to parameters such as the receiving and transmitting time of the information, and update its maintained information using the latest information.

Figure 2A:
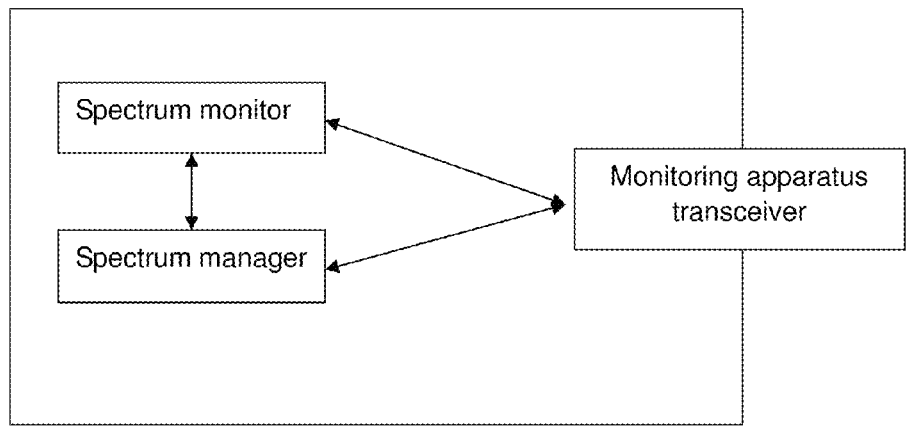
FIG. 2a illustrates a block diagram of an apparatus for monitoring spectrum resource utilization in wireless networks arranged in each wireless network according to an embodiment of the invention.
Figure 2B:
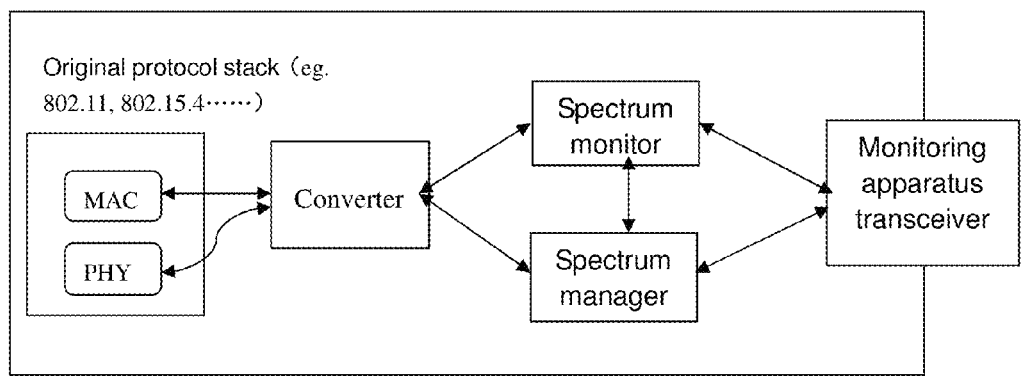
FIG. 2b illustrates a block diagram of an apparatus for monitoring spectrum resource utilization in wireless networks arranged in each wireless network according to another embodiment of the invention.

FIGS. 2a-b respectively illustrate the block diagrams of a sub-coordinating apparatus according to the embodiments of the invention. As shown in FIG. 2a, the sub-coordinating apparatus includes a monitoring apparatus transceiver, a spectrum monitor and a spectrum manager. The monitoring apparatus transceiver is used for receiving information from the coordinating apparatus and transmitting information to the coordinating apparatus via a wired or wireless link established with the coordinating apparatus. The spectrum monitor is responsible for monitoring spectrum utilization of wireless networks, and transmitting the monitored information to the coordinating apparatus via the monitoring apparatus transceiver. Here, the monitored information could be any information capable of representing the situation of spectrum utilization in a wireless network, including but not limited to, e.g., one, more than one, or all of the following information: which spectrum resources the wireless network is currently using, the spectrum utilization efficiency in this wireless network, the quality of the channel occupied by this wireless network, the load of this wireless network, the current service quality of the network, the desired/required service quality of this wireless network, signal to noise ratio (SNR), and network running status (e.g. establishment/initiation, running, failure, disuse, invalidity of the network), as long as the information can reflect the situation of the spectrum utilization of the network. Here, the monitoring could be periodical, or it could also be real-time (e.g. based on the receipt of a reclaim spectrum resource message), or even combinations thereof. For instance, taking periodical or real-time monitoring as an ordinary state and in the meantime allowing a flexible temporary adjustment to be made along with the specific conditions of the network running.

The spectrum manager can analyze the monitored spectrum utilization to make judgments on the spectrum utilization, for example, to determine whether there is a need to request new spectrum resources from the coordinating apparatus, to release some spectrum resources, to adjust spectrum resources, etc. If it is necessary, e.g., the network is at the phase of establishment/initiation, the network load increases, the requirement of service quality rises or the like, spectrum requirement information is then transmitted to the coordinating apparatus via the monitoring apparatus transceiver. Moreover, the spectrum manager can also execute an indication about the spectrum resource utilization received from the coordinating apparatus, or forward the indication to a corresponding implementing apparatus in the wireless network. The implementing apparatus can perform a corresponding operation according to the received indication, including using the new spectrum selected and allocated by the coordinating apparatus from sharable spectrum resource to this wireless network, releasing the indicated spectrum resource from the spectrum resources used by this wireless network, adjusting the wireless network application to the allocated new spectrum resource, etc.

Here, the packet format (which will be described in the following) of the communications between the sub-coordinating apparatus and coordinating apparatus may be different from the packet format of data communications within the specific wireless network. Thus, a data format conversion is necessary in this case, namely, the indication flowing from the sub-coordinating apparatus to the corresponding apparatus in the network will be converted to a data packet of a specific standard or protocol followed by this wireless network communication, e.g., converted to packets abiding by Standard 802.11a/b/g or 802.15.4, while the packets flowing from the corresponding apparatus in the network to the sub-coordinating apparatus are converted in an opposite way. Such conversion may be performed at the sub-coordinating apparatus, corresponding apparatus (as the destination of the packets) or central nodes between them, and may be performed by a converter which is separate or integrated into other functional devices/modules (such as being integrated into the spectrum manager). In another embodiment, the conversion task was added to the coordinating apparatus, that is, both the corresponding apparatus and the sub-coordinating apparatus in the wireless network interact in accordance with the original protocols, and the coordinating apparatus converts the received packets to a format it can recognize.

In another exemplary embodiment, the sub-coordinating apparatus itself has an ability of executing the indication sent by the coordinating apparatus. In this situation, the spectrum manager executes the received indication. One such exemplary embodiment is illustrated in FIG. 2b. As shown in FIG. 2b, after receiving an indication from the coordinating apparatus, the spectrum manager of a sub-coordinating apparatus converts the received indication to a format that the communication standard followed by this network can recognize and further execute by a converter (a separate converter is illustrated herein), and applies it to the spectrum utilization of the wireless network. What should be noted is that, under this circumstance, the structure illustrated by FIG. 2b is an example. For instance, the converter illustrated in FIG. 2b is not necessary if such conversion has already finished before the packet arrives at the sub-coordinating apparatus, e.g. it has already been accomplished on the coordinating apparatus or the node apparatus between the coordinating apparatus and sub-coordinating apparatus.

In another embodiment, the spectrum manager further determines whether certain spectrum resources need to be released based on the information associated with spectrum utilization monitored by the spectrum monitor, e.g., based on the current spectrum utilization efficiency; and if yes, releases corresponding spectrum resources and notifies the coordinating apparatus (it will be described in detail in the following, and the operation when the sub-coordinating apparatus actively releases spectrum resources is called "active mode" in this document). In other embodiments, the spectrum manager can also determine whether there is a need to request the coordinating apparatus to adjust the spectrum resource allocated to this wireless network, that is, to release some or all of the spectrum resources that are currently used, and to request for an allocation of new spectrum resources to this wireless network. It is easy to understand that the sub-coordinating apparatus releases part of the spectrum resources first and subsequently requests new spectrum resources from the coordinating apparatus. It is also possible that the sub-coordinating apparatus requests new spectrum resources first and releases resources with low use efficiency or poor effect if the allocated spectrum resources are more suitable. In another embodiment, the spectrum manager is further configured to, after receiving a reclaim spectrum resource message from the coordinating apparatus, determine whether there are any reclaimable spectrum resources based on the spectrum utilization monitored by the spectrum monitor, and if yes, notify the allocation apparatus of the reclaimable spectrum resources.

Figure 3:
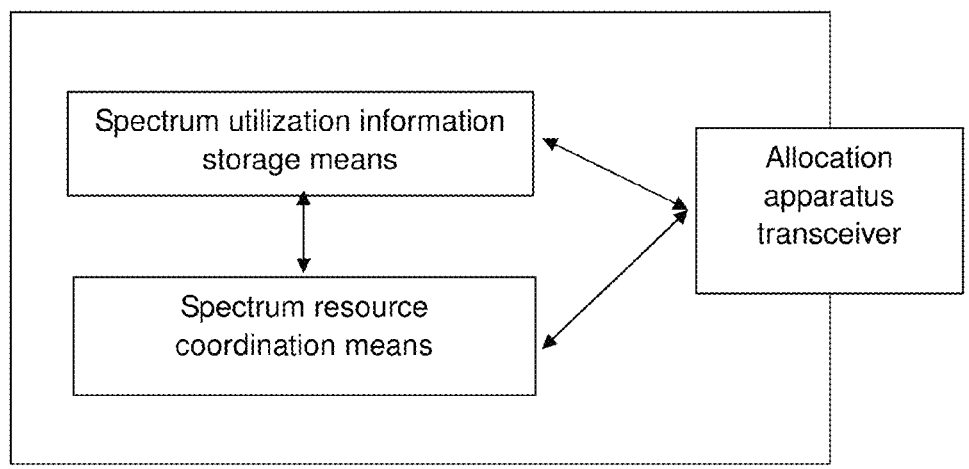
FIG. 3 illustrates a block diagram of an apparatus for allocating spectrum resource among wireless networks arranged in networks according to an embodiment of the invention.

FIG. 3 illustrates a block diagram of a coordinating apparatus according to an embodiment of the invention. Similar to the sub-coordinating apparatus, the coordinating apparatus also includes an allocation apparatus transceiver for receiving information from or transmitting information to sub-coordinating apparatuses. Additionally, as shown in FIG. 3, the coordinating apparatus further includes spectrum utilization information storage means for: maintaining information associated with the spectrum utilization of the networks where each sub-coordinating apparatus is located, and updating the maintained corresponding information when receiving information associated with spectrum utilization (preferably information associated with the change of spectrum utilization) from the sub-coordinating apparatus or after the coordinating apparatus has conducted a new allocation on the shared spectrum resources.

In an embodiment, such a scenario is possible: the coordinating apparatus finds that its spectrum resource coordination means has just conducted an allocation on the maintained spectrum resource, on, before, or shortly after the receipt of the updated information about the spectrum utilization from the sub-coordinating apparatus, such as information from a sub-coordinating apparatus notifying the release of some resources, whereby the information of the two are inconsistent. In this case, the spectrum utilization information storage means of the coordinating apparatus may determine which one is more recent from aspects, such as time and the like.

A spectrum resource coordination means, used for after a sub-coordinating apparatus, sends out information for requesting a new spectrum resource and may allocate appropriate spectrum resources to the sub-coordinating apparatus which has transmitted the spectrum requirement information based on the information maintained by the spectrum utilization information storage means. Here, the information for requesting a new spectrum resource could be a spectrum request actively sent by the sub-coordinating apparatus to the coordinating apparatus, or it could be information reflecting the spectrum requirement fed back by the sub-coordinating apparatus after the coordinating apparatus actively enquiring upon the sub-coordinating apparatus about the spectrum requirement upon an event, e.g., it discovered a new sub-coordinating apparatus, a certain network runs abnormally, etc. In addition, in an exemplary embodiment, the spectrum resource coordination means preferably allocates unoccupied (i.e., idle) spectrum resources to the wireless network monitored by the sub-coordinating apparatus sending the spectrum request first. In another exemplary embodiment, if there is no spectrum resource suitable for such allocation in the unoccupied spectrum resources, the spectrum resource coordination means is configured to consider making an allocation from the spectrum resources that have been occupied (namely, resources that have been allocated to other wireless networks).

In the embodiment illustrated in FIG. 3, the coordinating apparatus is responsible for allocating sharable spectrum resources among wireless networks sharing spectrum resources. As for the reclaim of the allocated spectrum resources, it depends on the sub-coordinating apparatus, and this is the active mode mentioned above. Specifically, when the allocated spectrum resources will be released is decided by the sub-coordinating apparatus (not by the coordinating apparatus), and such decision may be, for example, based on the situations of spectrum utilization of the wireless networks monitored by the sub-coordinating apparatus. If the sub-coordinating apparatus decides to release some spectrum resources, the sub-coordinating apparatus will notify the coordinating apparatus of information indicating which spectrum resources are to be released. Then the coordinating apparatus updates its maintained information accordingly and thereby reclaims the releasable spectrum resources indicated by the sub-coordinating apparatus. In other words, in this embodiment, the coordinating apparatus leaves the right of releasing spectrum resources and the determination work to the sub-coordinating apparatus.

However, alternatively, in other embodiments, the coordinating apparatus could unicast to a certain sub-coordinating apparatus, multicast to several sub-coordinating apparatuses, or broadcast to all the sub-coordinating apparatuses a reclaim spectrum resource message periodically or under the circumstances that, for example, the allocable (or some specific)

spectrum resources are lower than the predetermined amount or have not received information associated with spectrum utilization from a(some) certain sub-coordinating apparatus(es) in a certain period of time, or a(some) certain wireless network(s) has occupied a relatively larger amount of spectrum resources for a long time. After receiving the reclaim spectrum resource message from the coordinating apparatus, the sub-coordinating apparatus can, based on the network status monitored by its spectrum monitor, decide by the spectrum resource manager whether to release some spectrum resources occupied by this wireless network and send information about which spectrum resources are released back to the coordinating apparatus.

Alternatively, the sub-coordinating apparatus may also send the network status monitored by it to the coordinating apparatus directly, and it is up to the coordinating apparatus (more specifically, by the spectrum resource coordinator) to decide which allocated spectrum resources are to be reclaimed. Furthermore, the coordinating apparatus (the spectrum resource coordination means in the embodiment illustrated by FIG. 3) may determine whether to reclaim the spectrum resources that have been allocated to certain wireless network(s) and allocate new resources that are more suitable to it (them), according to the specific situations of spectrum utilization, e.g., the coordinating apparatus has received a new spectrum request but does not have enough spectrum resource to allocate, or a certain wireless network is low in spectrum utilization efficiency and bad in quality, etc. In this case, the coordinating apparatus may send, for example, an adjusting spectrum resource message, to the sub-coordinating apparatus, in order to indicate the change of the allocated spectrum resources. In either case, contrary to the preceding active mode, it is referred to as "passive spectrum reclaim mode" in this document (the first one can be called "semi-passive mode", and the latter two may be called "wholly-passive mode").

In other exemplary embodiments, if the spectrum resource coordination means finds that there is no suitable spectrum resource to allocate to the sub-coordinating apparatus that has sent spectrum requirement information, for example, the existing allocable spectrum resources fail to satisfy or to completely satisfy the requirement of the sub-coordinating apparatus on the spectrum resource, it may send a reclaim spectrum resource message to certain sub-coordinator(s). The process is similar with the aforementioned passive mode, so details are omitted here. Thus, this situation also pertains to the passive spectrum reclaim mode mentioned above. However, in another embodiment, the reclaim spectrum resource message differs slightly from the preceding reclaim spectrum resource message in that the message contains compulsory information. In other words, whether some spectrum resources are released in this case can still be decided by the corresponding sub-coordinating apparatus or the coordinating apparatus, but the condition that must be satisfied for releasing spectrum resources is lowered. For instance, identical spectrum utilization efficiency in other situations, e.g., in semi-passive mode, may be regarded as acceptable and corresponding spectrum resources are determined not to be released; while in the case that compulsory information is contained, as to the same spectrum utilization efficiency, the wireless network may be considered as failing to make an effective use of the allocated spectrum resources due to the compulsory information, and thereby corresponding spectrum resources are compulsorily released. Here, the compulsory information may relate to indications of all kinds of proper information, such as spectrum utilization efficiency, channel quality, network load, quality of current service, requirements of service quality, SNR, network running status, priority of different networks, etc., so that the overall operating situation of the network is considered when the sub-coordinating apparatus decides whether to release some spectrum resources. Alternatively, compulsory information may also be preconfigured on the sub-coordinating apparatus, such that it is unnecessary to receive specific compulsory information every time and a simple notification message from the coordinating apparatus is enough. In another embodiment, the two ways may be combined for use, i.e., in case that special and additional compulsory information which is not set beforehand is required, the coordinating apparatus transmits the information to the sub-coordinating apparatus, otherwise corresponding compulsory information reserved by the sub-coordinating apparatus beforehand will be utilized.

In other embodiments, if there are no appropriate spectrum resources for conducting the allocation, the spectrum resource coordinator of the coordinating apparatus can decide to reclaim the spectrum resources allocated to the wireless network(s) directly, according to its maintained information associated with the spectrum utilization of each wireless network (may also based on the received request for spectrum resource). In this situation, it can allocate the spectrum resources being decided to reclaim the requests for spectrum resources to the sub-coordinating apparatus, and indicate in messages, such as a release spectrum resource message, which resources are to be released (i.e., these resources are reclaimed). Then the corresponding sub-coordinating apparatus performs the release operation.

In another embodiment, when there is no suitable resource for conducting the allocation as stated above, the spectrum resource coordinator of the coordinating apparatus can determine whether the sub-coordinating apparatus which sends requirements on spectrum resource can be satisfied by adjusting resource allocation. Specifically, if a wireless network with allocated spectrum resources has a low spectrum utilization efficiency, then there are spectrum resources more suitable for this wireless network in the existing allocable spectrum resources and the spectrum resource occupied by this wireless network fits the sub-coordinating apparatus which has requested spectrum resources; the spectrum resource coordinator can adjust such a wireless network to the more suitable spectrum resource, and it can allocate the spectrum resources released by this wireless network or appropriate parts thereof to the sub-coordinating apparatus requiring spectrum resources.

Figure 4:
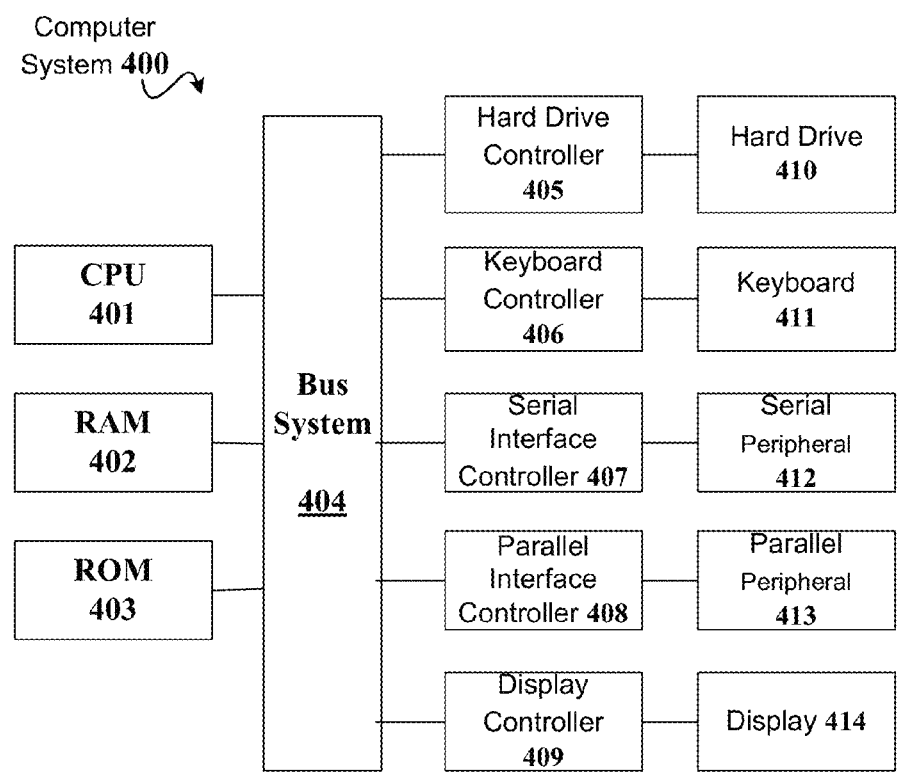
FIG. 4 illustrates a block diagram of a computer system 400 for implementing an embodiment of the invention.

A person skilled in the art may understand that the apparatuses illustrated in FIGS. 2 and 3 can be implemented by software, hardware, firmware or any combinations thereof. FIG. 4 illustrates a block diagram of a computer system 400 for implementing the embodiments according to the present invention. As shown in FIG. 4, the computer system 400 includes a Central Processing Unit (CPU) 401, a Random Access Memory (RAM) 402, a Read Only Memory (ROM) 403, a system bus 404, a Hard Drive Controller 405, a Keyboard Controller 406, a Serial Interface Controller 407, a Parallel Interface Controller 408, a Display Controller 409, a Hard Drive 410, a Keyboard 411, a Serial Peripheral Equipment 412, a Parallel Peripheral Equipment 413 and a Display 414. Among these devices, CPU 401, RAM 402, ROM 403, Hard Drive Controller 405, Keyboard Controller 406, Serial Controller 407, Parallel Controller 408 and Display Controller 409 are coupled to the System Bus 404. The Hard Drive 401 is coupled to the Hard Drive Controller 405, the Keyboard 411 is coupled to the Keyboard Controller 406, the Serial Peripheral Equipment 412 is coupled to the Serial Interface Controller 407, the Parallel Peripheral Equipment 413 is coupled to the Parallel Interface Controller 408, and the Display 414 is coupled to the Display Controller 409. When the present invention is implemented by software, computer executable instructions may be stored on any one or more of Hard Drive 410, RAM 402 and ROM 403, or stored on the peripheral storage means or removable storage means which can be operatively coupled to the computer system 400. If the invention is implemented by hardware, firmware or the above manner of combining with software, the corresponding means can be directly or indirectly coupled to the system bus 404.

It should be noted that the structural diagram in FIG. 4 is merely for the purpose of an illustration and not a limitation to the scope of the invention. In some cases, some apparatuses may be added or reduced according to specific situations and application requirements. It is easy to understand that, the implementation of the invention does not exclude the implementation of other functions by the system as well as by any apparatus or means of the system. In other words, the apparatus for implementing the invention may also be equipped with a corresponding configuration and structure for performing other specific functions as required. Furthermore, as stated above, the apparatus of the invention may be a separate isolated apparatus, or resident on the existing other apparatuses in the network; optionally, the apparatus for implementing the invention could be distributive, and the specific manner of implementation could be altered adaptively by those skilled in the art according to particular network environment.

Figure 5:
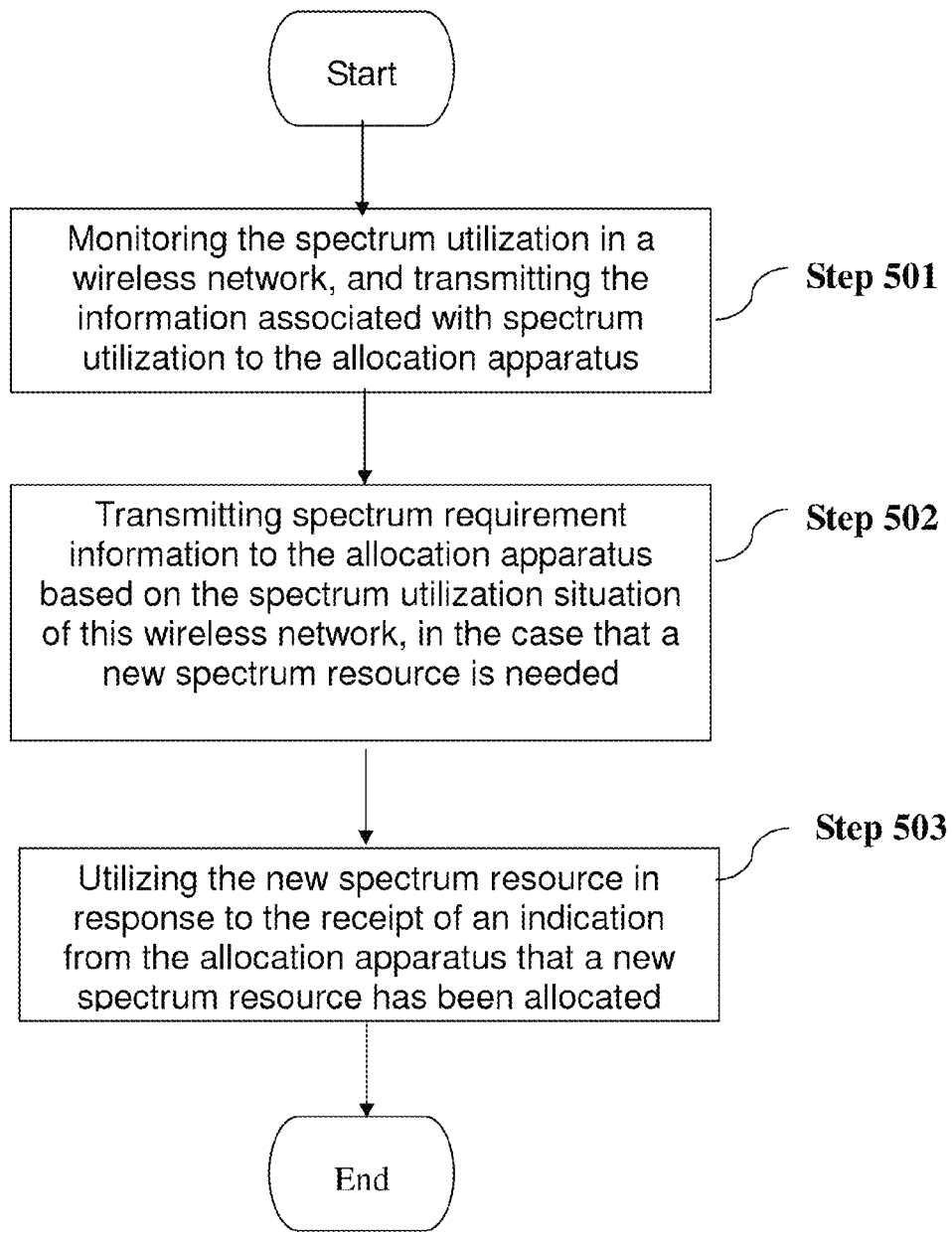
FIG. 5 illustrates a flow chart of a method performed at the apparatus for monitoring spectrum resource utilization in wireless networks according to an embodiment of the invention.

FIG. 5 illustrates a flow chart of a method performed at a sub-coordinating apparatus according to an embodiment of the invention. As shown in FIG. 5, at step 501, the spectrum utilization of the wireless networks is monitored. Here, in an embodiment, as stated above, the monitored information associated with spectrum utilization can also be transmitted to the allocation apparatus (i.e., the coordinating apparatus), if needed. Understandably, the transmission here could be real-time, periodical or combinations thereof. Understandably, specific configurations on when and how to perform the transmissions are dependent on the particular application environment and requirement, and in certain cases, such transmissions are allowed to have certain delay.

At step 502, based on the monitored situation of the spectrum utilization of this wireless network, the sub-coordinating apparatus (such as the spectrum manager illustrated in FIG. 2) can transmit spectrum requirement information to the coordinating apparatus if new spectrum resource is needed.

Subsequently, at step 503, the sub-coordinating apparatus based on the receipt of an indication about the allocation of a new spectrum resource from the coordinating apparatus, as stated above, applies the allocated new spectrum resource to this wireless network (e.g., by the sub-coordinating apparatus illustrated in FIG. 2*b*). Alternatively, it may also forward (e.g. by the sub-coordinating apparatus illustrated in FIG. 2*a*) the received indication to a corresponding apparatus that can execute this indication in the wireless network. In one embodiment, the received and executed indication may be one or more of the following messages, such as, a spectrum resource allocation message indicating which new spectrum resource is allocated to this wireless network, a reclaim spectrum resource message enquiring whether there is reclaimable spectrum resource, a release spectrum resource message indicating which spectrum resources need to be released, an adjusting spectrum resource message indicating which spectrum resources will be reclaimed and which new spectrum resources will be allocated, etc. In this embodiment, the task of deciding whether to release some allocated spectrum resources and which spectrum resources are to be released is accomplished by the coordinating apparatus, while the sub-coordinating apparatuses are responsible for executing the commands from the coordinating apparatus.

For example, when a certain wireless network (such as a wireless local area network or a wireless sensor network) sets up, the spectrum monitor in the sub-coordinating apparatus in the network, such as access point AP or anchor, finds that the network is in a state of establishment (step 501), and the sub-coordinating apparatus (particularly, such as the spectrum manager) then determines that it needs to request the coordinating apparatus for spectrum resources (step 502). Consequently, the sub-coordinating apparatus establishes a connection (e.g., an Ethernet connection) with the coordinating apparatus, and transmits information requesting spectrum resources to the coordinating apparatus, such as a spectrum request message.

Here, the spectrum request message may include items such as network ID field, package type field (for indicating the packet is a spectrum request packet), etc. The network ID is a unique identifier that differentiates different wireless networks. Optionally, if the coordinating apparatus does not have any information about the network, this message may also contain a network type field to identify the network type of the wireless networks monitored by the sub-coordinating apparatus (such as WiFi, wireless local area network, wireless HART, and the like). Since different types of networks normally have different transmission features and Quality of Service (QoS) requirements, this information may help the coordinating apparatus to perform the spectrum allocation more effectively and rationally. For example, the wireless LAN for video or audio transmissions generally has a higher QoS requirement due to its high data transmission rate and low latency tolerability. Thus, the more detailed the information obtained by the coordinating apparatus, the more reasonable the resource allocation will be.

In other embodiments, the spectrum request message may additionally or alternatively include one, more than one, or all of frequency field, bandwidth field and parameter field. Here, the frequency field can be used to represent one or more frequency points or frequency ranges that are requested or preferable for the current network situation (e.g., in combination with the network load, network application/service type, requirement of service quality, etc.). Since some wireless networks can work at a wider frequency range instead of working at a special frequency point, or there might be a preferable spectrum point or range for a specific wireless network along with the changes of specific instances, such as the characteristics of the applications/services provided by the wireless networks in a certain period of time or network load and requirement of service quality, or there are relatively more frequency points/ranges available for selection for an allocation, this information obviously facilitates the allocation and coordination of the spectrum resource of the whole network by the coordinating apparatus. For example, the WiFi network can work at any one of three predefined frequency points, while available frequency points can be up to 16 in 2.4 GHz for those wireless networks following IEEE 802.16.4 standard. The wireless networks following the standards IEEE 802.11b and 802.15.4 indicated in the Background of this text also have a plurality of frequency ranges for selection. Thus, the frequency field provides the spectrum allocation a certain selection space by the coordinating apparatus, i.e., the coordinating apparatus has a certain freedom, and can make a reasonable resource allocation quicker. The bandwidth field indicates the required spectrum bandwidth, which mainly reflects the system throughout the wireless network. The parameter field provides some characteristic descriptions of the request, such as the channel quality, SNR, and QoS requirement of the wireless network, to reflect the features of the wireless network.

It should be noted that, although the above specifically introduces several fields that can be contained in the spectrum request message, the introduction is merely an example, and does not intend to limit the invention to messages including these fields. According to the disclosure of the invention, a person skilled in the art can understand that there are many alternative embodiments. For example, in the absence of some fields, it is possible that the coordinating apparatus maintains relevant information, or the coordinating apparatus itself has a default setting, or the situation of the wireless network could be deduced from prior information, etc.

Then, the coordinating apparatus allocates available spectrum resources to this wireless network based on the receipt of the spectrum request message, which will be explained in the following in combination with FIG. 6. After conducting the allocation, the coordinating apparatus can notify the sub-coordinating apparatus of the information indicating the spectrum resource utilization. The message can, for example, include fields such as network ID, package type, frequency, bandwidth and the like. Wherein, the package type indicates that this is a spectrum allocation packet. The frequency and bandwidth fields indicate the allocated frequency and bandwidth. In general, if a request message contains the desired frequency, the allocated frequency normally belongs to the desired frequency range as indicated, and the allocated bandwidth can satisfy the requirement of this wireless network entirely. Of course, it could be understood that in some scenarios where resources are in a shortage, the wireless network may be assigned with spectrum resources that can partly satisfy its requirement or even does not have allocated spectrum resources in a period of time (the request is refused). This relies on the operating situation of the whole network, the priority of the wireless network requesting for resources, etc.

Therefore, the sub-coordinating apparatus performs step 503, namely, utilizing the allocated resources to the wireless network, or making the corresponding network apparatus perform the operation. Then, the sub-coordinating apparatus or the corresponding network apparatus can configure an initial protocol stack and initiate the network. Then data transmission in the network and service provided for the subscribers are both dependent on these allocated spectrum resources. Subsequently, during the running of the network, the sub-coordinating apparatus can monitor the running situation of the wireless network, namely, step 501, including but not limited to the physical channel quality and aforementioned network load. And when new resources are required, e.g., the network load increases, the channel quality deteriorates, the utilization efficiency of some spectrum resources is low, etc., step 502 is performed, and then step 503, the operation indicated by the coordinating apparatus is performed (details are omitted here).

As stated above, in embodiments, in addition to performing or forwarding the received indications about spectrum allocation from the coordinating apparatus (including allocating new resources, reclaiming some resources, adjusting applications/services to the new allocated resources or the like), the sub-coordinating apparatus can also decide by itself whether to release some spectrum resources based on the usage situation of the network spectrum monitored in step 501. For example, for some resources with low utilization efficiency, e.g., some physical channels are always bad, such as deep fading and low SNR, or some spectrum resources have been spare for a certain time (e.g., exceeding a predetermined threshold), the sub-coordinating spare can decide to release corresponding spectrum resources such that the coordinating apparatus reclaims part of the allocated spectrum resources. This is because although the sub-coordinating apparatus has determined that the resources to be released are not suitable for this wireless network any more, this part of the resources may fit other wireless networks. Alternatively, when the sub-coordinating apparatus finds that some resources are low in utilization efficiency but this wireless network still needs certain spectrum resources (i.e., releasing these resources cannot satisfy the requirement of the network), as stated above, it may request that the coordinating apparatus adjust the allocated resources, that is, notify the coordinating apparatus that this part of the resources have been released, and request for an allocation of new spectrum resources. The various different implementing modes hereinabove pertain to the aforementioned active mode.

In other embodiments, the sub-coordinating apparatus (such as its spectrum manager) can, based on a release spectrum resource message sent by the coordinating apparatus, release the resource indicated in the message (the compulsory release mentioned above, e.g., in the case that the spectrum resources of the whole network are in shortage). In another embodiment, the sub-coordinating apparatus can, based on the received reclaim spectrum resource message, analyze the monitored spectrum utilization information of the network to determine whether there are releasable resources, and if yes, release the resources to make the coordinating apparatus reclaim these resources. In another embodiment, the sub-coordinating apparatus directly transmits the monitored spectrum utilization information of the network to the coordinating apparatus which decides whether to release and which spectrum resources are to be released. The various different implementing modes hereinabove pertain to the passive mode indicated above. Since the coordinating apparatus knows the operating situation of the whole network, in the passive mode, it can make an optimal decision in some scenarios.

Here, the release spectrum resource message and reclaim spectrum resource message may have similar formats with the preceding messages, e.g., including one, more than one, or all the fields such as network ID, package type, network type, frequency, bandwidth, parameters, and the like, so as to provide necessary information in the above different implementing modes. For instance, indicating the packet is a (compulsory) reclaim spectrum resource packet, which frequency and bandwidth will be reclaimed, resources whose spectrum utilization efficiency, channel quality or the like, what extent needed to be released and reclaimed, etc.

Figure 6:
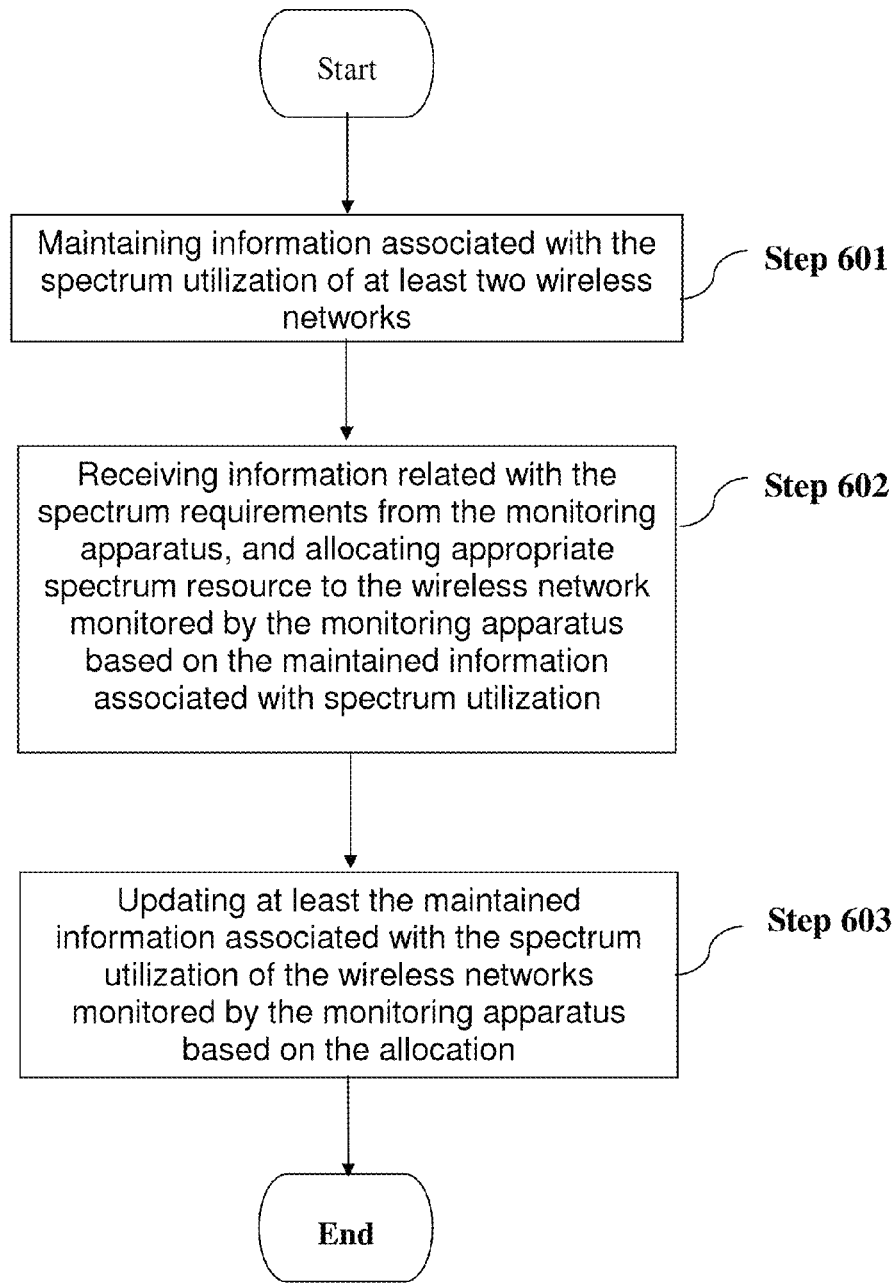
FIG. 6 illustrates a flow chart of a method performed at the apparatus for allocating spectrum resource according to an embodiment of the invention.

FIG. 6 illustrates a flow chart of a method performed at a coordinating apparatus according to an exemplary embodiment of the invention. As shown in FIG. 6, at step 601, the coordinating apparatus (such as the spectrum resource maintaining means in FIG. 3) maintains information associated with the spectrum utilization of at least two wireless networks. At step 602, if the coordinating apparatus receives information related to spectrum requirements from the monitoring apparatus (i.e., sub-coordinating apparatus), it allocates appropriate spectrum resources to the wireless networks monitored by the sub-coordinating apparatus that transmits the spectrum requirement information, based on the maintained information associated with spectrum utilization. At step 603, updating the maintained corresponding information is performed based on the allocation conducted at step 602. Specifically, for example, updating at least the maintained information associated with the spectrum utilization of the wireless networks monitored by this monitoring apparatus is performed. Additionally or alternatively, at step 603, the updating can also be performed based on the received information associated with the spectrum utilization from the sub-coordinating apparatus. Here, it should be noted that, the operation of updating corresponding information based on the received information associated with the spectrum utilization from the sub-coordinating apparatus in step 603 is obviously independent with the step 602, namely, the execution of this step has no logical/temporal relation with the allocating operation in step 602.

Moreover, in some embodiments, the coordinating apparatus can also maintain a periodical or nonscheduled interaction with the sub-coordinating apparatuses. The coordinating apparatus can deduce that certain wireless network(s) is (are) still running, or has been closed or is invalid due to fault, based on the interaction with the sub-coordinating apparatuses. Thus the coordinating apparatus can reclaim the resources allocated to those networks.

As described above, herein, in some cases such as in the case that the available/allocable spectrum resources maintained by the coordinating apparatus are lower that a certain threshold, or in the case that although a message requesting spectrum is received, there is no allocable resource or not enough allocable resource to satisfy the requirement, the coordinating apparatus may also send a release spectrum resource message to one (several) or all of the sub-coordinating apparatuses, and reclaim the spectrum resource(s) allocated to the wireless network(s) monitored by this (these) sub-coordinating apparatus(es) directly. In addition, the coordinating apparatus may also allocate new spectrum resources to the wireless network(s) where a (some) sub-coordinating apparatus(es) is (are) located under the above circumstances, namely, adjust it (them) to operate on the new spectrum resource. In some implementations, it might be beneficial for the coordinating apparatus to always keep certain spectrum resources or spectrum resources of some specific frequency bands available, which can, for example, reserve certain spectrum resources for use in case of emergency. In the embodiments of the invention, the coordinating apparatus can determine to reclaim spectrum resources directly based on its maintained spectrum utilization information, or make such determination based on the latest situations of the spectrum utilization fed back by the sub-coordinating apparatus. In other embodiments, when the resources are in a shortage, the coordinating apparatus can adjust parameter values representing releasable spectrum resources according to specific situations, to force more spectrum resources to be released, e.g., releasing resources whose utilization efficiency is not very low (usually higher than the value of utilization efficiency in active mode), so as to satisfy the utilization requirements on spectrum resources of networks which are more urgent or with a higher priority. Moreover, in an embodiment, the above operations could be performed circularly until the coordinating apparatus determines that it has reserved enough spectrum resources or the reclaimed resources can satisfy the requirements of the requesting wireless networks, or the like.

It is also possible that, for example, there is no allocable spectrum resource in a period of time, or there is still no spectrum resource that can satisfy or fully satisfy a specific wireless network after attempting operations to reclaim spectrum resources. In this situation, the coordinating apparatus can check whether there are any appropriate resources for allocation periodically or non-periodically, and if yes, notify the sub-coordinating apparatus. Optionally, the coordinating apparatus can also allocate the allocable spectrum resources to this wireless network first, in order to satisfy at least a part of its requirement. No matter how it is operated, those skilled in the art could understand that operations such as allocation, spectrum reclamation or the like performed at the coordinating apparatus could be performed circularly. Accordingly, the request of the sub-coordinating apparatus may be refused, satisfied or partly satisfied with different operating situations of the network.

The process flow for implementing the embodiments of the invention is presented above. Nevertheless, it could be understood according to the above operations that, the embodiments for implementing the method of the invention are not limited to the sequence described and illustrated, but can be adaptively change according to concrete conditions of network applications, as long as they do not depart from the spirit of the present invention. For instance, the sub-coordinating apparatus may monitor the network operating situations (step 501) after receiving the reclaim spectrum resource message (like step 503), and then determine whether a new spectrum resource is needed (step 502), such as the situation that the existing spectrum utilization efficiency is low and it is necessary to be adjusted to a new spectrum. Yet another example is that the coordinating apparatus can, by means of a constant receipt of information associated with the spectrum utilization from the sub-coordinating apparatus (step 603), implement a maintaince of spectrum utilization information of several wireless networks (step 601), and conduct corresponding allocation after receiving a message requesting spectrum resources. Yet another example is that, the coordinating apparatus could allocate the sharable spectrum resources of wireless networks, such as an initial allocation (step 602), then maintain the utilization information of these spectrum resources (step 601), and at last conduct an update if needed, namely, step 603.

In the above description, the situation that there are no spectrum resources suitable for allocation refers to the case that there are no spectrum resources suitable for allocation among spare spectrum resources. However, the allocation modes of the invention are not limited to the specific mode of allocating from the spare resources. On the contrary, it is also feasible to arrange the present invention to look for the spectrum resources most suitable for the allocation in shared resources by the coordinating apparatus according to the concrete application environment. A person skilled in the art shall understand that any change suitable for a specific application environment and requirement could be made on the allocation modes as long as the change does not depart from the concept of the present invention.

Various exemplary embodiments of the present invention are described hereinabove in combination with the figures. What should be noted is that the above embodiments merely aim to introduce the basic principle of the invention, not to limit the invention in any degree on any aspects such as operation details, specific application environment, operating flows, information format and so on. For example, the invention may be applied to any frequency band which provides the possibility of resource sharing for wireless networks, such as the television frequency band of the United States, that is to say, it is not limited to the ISM frequency band mentioned above. Another example is that, those skilled in the art can, based on the disclosure, make any feasible adaptive amendment, combination, split, deletion and the like on the method steps, apparatus structure or the like described in the invention according to actual application requirements, for example, splitting the spectrum manager of the sub-coordinating apparatus in the invention into a spectrum request means and spectrum release means, and splitting the spectrum resource coordinator of the coordinating apparatus into a spectrum allocation means, a spectrum reclaim means, a spectrum adjusting means, etc.

In a word, the solution of the invention is not limited to the concrete sequence and form described in the embodiments combined with the figures, and falls into the contents sufficiently disclosed by the invention as long as it has content which is identical or equivalent with the above embodiments and does not depart from the spirit of the invention.

The invention claimed is:

1. An allocation apparatus for allocating spectrum resources in wireless networks, comprising:
   an allocation apparatus transceiver;
   spectrum utilization information storage means; and
   spectrum resource coordination means,
   wherein:
   said allocation apparatus transceiver is configured to receive and transmit information;
   said spectrum utilization information storage means is configured to maintain information associated with a current spectrum utilization of at least two wireless networks, wherein said at least two wireless networks share at least part of said spectrum resources and the spectrum utilization of said at least two wireless networks are monitored by a monitoring apparatus, said maintained information associated with said spectrum utilization of at least two of said wireless networks comprising: spectrum resources which are utilized, and spectrum utilization efficiency, channel quality, network load, current quality of service, requirement of service quality, signal to noise ratio, network running status, priority of wireless networks, workable frequency point or frequency range of a wireless network and network type;
   said spectrum resource coordination means is configured to allocate appropriate spectrum resources to said wireless networks monitored by said monitoring apparatus based on the information associated with said current spectrum utilization of at least two of said wireless networks maintained by said spectrum utilization information storage means, after receiving information associated with a spectrum requirement from said monitoring apparatus in at least one of said wireless networks via said allocation apparatus transceiver, the allocating of appropriate spectrum resources comprising: selecting appropriate spectrum resources to conduct said allocation from spectrum resources that have been allocated to other wireless networks based on the information associated with said spectrum utilization of at least two of said wireless networks maintained by said spectrum utilization information storage means; and
   said spectrum utilization information storage means updates at least said maintained information associated with said spectrum utilization of said at least two wireless networks monitored by said monitoring apparatus based on the allocation of said spectrum resources by said spectrum resource coordination means,
   wherein said spectrum resource coordination means sends a reclaim spectrum resource message to said monitoring apparatus in at least one of said other wireless networks via said allocation apparatus transceiver, and selects spectrum resources suitable for allocation or reservation based on a response to said message by said monitoring apparatus that have received said message.

2. The allocation apparatus according to claim 1, wherein said at least two wireless networks comprise heterogeneous wireless networks.

3. The allocation apparatus according to claim 1, wherein said spectrum utilization information storage means updates said maintained corresponding information associated with said spectrum utilization after receiving information associated with a change of spectrum utilization from said monitoring apparatus in at least one of said wireless networks via said allocation apparatus transceiver.

4. The allocation apparatus according to claim 1, wherein said spectrum resource coordination means is further configured to allocate new spectrum resources to said other wireless networks.

5. The allocation apparatus according to claim 1, wherein said spectrum resource coordination means conducts said allocation based on at least one of priority of wireless networks, workable frequency point or frequency range of a wireless network, channel quality, network load, current quality of service, requirement of service quality, signal to noise ratio, network running status, and network type.

6. A monitoring apparatus for monitoring spectrum utilization in wireless networks, comprising:
   a monitoring apparatus transceiver;
   a spectrum monitor; and
   a spectrum manager,
   wherein:
   said monitoring apparatus transceiver is configured to receive and transmit information;
   said spectrum monitor is configured to monitor a current spectrum utilization in said wireless networks and transmit spectrum requirement information associated with said current spectrum utilization to an allocation apparatus for allocating spectrum resources in one of said wireless networks via said monitoring apparatus transceiver, wherein said wireless network shares at least part of said spectrum resource with at least one other of said wireless network and said allocating spectrum resources to said wireless networks at said allocation apparatus is based on said spectrum requirement information associated with said current spectrum utilization of at least two of said wireless networks;
   said spectrum manager is configured to, based on said spectrum utilization monitored by said spectrum monitor, provided that a new spectrum resource is required, transmit spectrum requirement information to said allocation apparatus via said monitoring apparatus transceiver, and receive an indication from said allocation apparatus that said new spectrum resource has been allocated and in response to said indication, is operable to use said allocated new spectrum resource,
   wherein said spectrum monitor performs at least one of a real-time monitoring and a periodical monitoring;
   said spectrum requirement information associated with spectrum utilization comprises which spectrum resources are used, and also comprises spectrum utilization efficiency, channel quality, network load, current quality of service, requirement of service quality, signal to noise ratio, network running status, priority of wireless networks, workable frequency point or frequency range of wireless network and network type; and
   said spectrum manager is configured to further execute: a reclaim spectrum resource message, received from said allocation apparatus, for enquiring whether there is any reclaimable spectrum resource in at least one of said other wireless networks,
   said spectrum manager is further configured to determine whether there are reclaimable spectrum resources based on said spectrum utilization monitored by said spectrum monitor, and upon determining that there are, notify said allocation apparatus of releasable spectrum resources or monitored information associated with spectrum utilization, and said spectrum manager is configured to further execute at least one or both of the following indications from said allocation apparatus: a release spectrum resource message, for indicating which spectrum resources in said at least one of said other wireless networks need to be released; and an adjusting spectrum resource message, for indicating which spectrum resources in at least one of said other wireless networks are to be reclaimed and which new spectrum resources are to be allocated.

7. The monitoring apparatus according to claim 6, wherein said spectrum manager forwards said indication to a corresponding apparatus that can execute said indication in said wireless network.

8. The allocation apparatus according to claim 1, wherein a packet format used for communicating data within a wireless network is different than a packet format of a data communication sent between a monitoring apparatus at said network and said spectrum resource coordination means, said apparatus further comprising:

a converter device, at said allocation apparatus, to convert packets associated with a received indication to allocate spectrum resources of a wireless network according to that network's wireless protocol or standard.

9. The monitoring apparatus according to claim 6, wherein a packet format used for communicating data within a wireless network is different than a packet format of a data communication sent between the monitoring apparatus at said network and said allocation apparatus, said apparatus further comprising:

a converter device to convert packets associated with a received indication to allocate spectrum resources of a wireless network according to that network's wireless protocol or standard.

10. The allocation apparatus according to claim 1, wherein the spectrum utilization information storage means determines a valid status of updated spectrum utilization information as received via either a sub-coordinating apparatus or, as determined after allocating spectrum resources, said valid status of updated spectrum utilization information determined based on time of allocating versus time of receiving updated information.

11. The monitoring apparatus according to claim 6, wherein the allocation apparatus further determines a valid status of updated spectrum utilization information as received via a monitoring apparatus or, as determined after allocating spectrum resources thereof, said valid status of updated spectrum utilization information determined based on time of allocating versus time of receiving updated information.

* * * * *